United States Patent
Park

(10) Patent No.: US 12,157,523 B2
(45) Date of Patent: Dec. 3, 2024

(54) METHOD FOR CONTROLLING TORQUE OFFSET COMPENSATION IN STEERING SYSTEM

(71) Applicants: Hyundai Motor Company, Seoul (KR); Kia Corporation, Seoul (KR)

(72) Inventor: Young Uk Park, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 234 days.

(21) Appl. No.: 17/867,924

(22) Filed: Jul. 19, 2022

(65) Prior Publication Data

US 2023/0166787 A1  Jun. 1, 2023

(30) Foreign Application Priority Data

Nov. 23, 2021  (KR) .................. 10-2021-0161947

(51) Int. Cl.
*B62D 5/04* (2006.01)
*B62D 15/02* (2006.01)

(52) U.S. Cl.
CPC .......... *B62D 5/046* (2013.01); *B62D 5/0409* (2013.01); *B62D 15/0215* (2013.01)

(58) Field of Classification Search
CPC .. B62D 5/046; B62D 5/0409; B62D 15/0215; B62D 15/025; B62D 6/10; B62D 1/286; B62D 6/00; B62D 5/0457; B62D 5/005; B62D 5/0463; B62D 15/021; B60W 10/20; B60W 40/105; B60W 2050/0022; B60W 2520/10; B60W 2540/18; B60W 2510/202; B60W 2710/202

See application file for complete search history.

(56) References Cited

U.S. PATENT DOCUMENTS

| 2007/0055426 | A1* | 3/2007 | Hara ................. | B62D 5/0409 |
| | | | | 701/41 |
| 2017/0106903 | A1* | 4/2017 | Moretti ............ | B62D 5/0472 |
| 2020/0108853 | A1* | 4/2020 | Moreillon ........... | B62D 7/09 |
| 2020/0384867 | A1* | 12/2020 | Yamada .............. | H02P 23/04 |
| 2021/0114653 | A1* | 4/2021 | Tsubaki ............. | B62D 5/0409 |
| 2022/0144341 | A1* | 5/2022 | Takhmar ............ | B62D 15/025 |
| 2022/0289277 | A1* | 9/2022 | Narasimhan ........ | B62D 5/001 |

FOREIGN PATENT DOCUMENTS

| KR | 10-2006-0035878 | | 4/2006 | |
| KR | 20170080405 A | * | 4/2016 | ......... B62D 5/0457 |

* cited by examiner

*Primary Examiner* — Bhavesh V Amin
*Assistant Examiner* — Esvinder Singh
(74) *Attorney, Agent, or Firm* — Morgan, Lewis & Bockius LLP

(57) ABSTRACT

The present disclosure relates to a technology for removing adverse effects on input torque by torque offset to improve and maintain a control function related to steering. A method for controlling torque offset compensation in a steering system, includes obtaining a torque offset value (input torque change value) for each steering angle under a hands-off condition of a steering wheel; determining compensation torque configured to counterbalance the torque offset value regarding the steering angle when the steering wheel is steered; and determining a final torque by applying the compensation torque to an input torque detected according to steering of the steering wheel.

17 Claims, 5 Drawing Sheets

METHOD FOR CONTROLLING TORQUE OFFSET COMPENSATION IN STEERING SYSTEM

CROSS-REFERENCE TO RELATED APPLICATION(S)

The present application claims priority to Korean Patent Application No. 10-2021-0161947, filed on Nov. 23, 2021, the entire contents of which is incorporated herein for all purposes by this reference.

BACKGROUND OF THE PRESENT DISCLOSURE

Field of the Present Disclosure

The present disclosure relates to a method for controlling torque offset compensation in a steering system, wherein adverse effects on input torque by torque offset are removed, improving and maintaining steering-related control functions.

Description of Related Art

In the case of MDPS control logic, during operations of default/cooperative control and ADAS control functions, an input torque value which is input to a torque detector is used to determine whether or not the driver intervenes.

For example, in the case of MDPD restorative logic, it is determined that the driver has intervened if the input torque is 0.05 Nm or higher, and the motor's restorative output is reduced.

In the case of lane keeping assist (LKA) or autonomous driving mode, an input torque of 0.25-0.4 or less is deemed to correspond to a hands-off state in which the driver's hands are off the steering wheel, and a warning sound/warning message is issued.

An input torque of 2-3 Nm or higher, on the other hand, is deemed to correspond to driver intervention, and the LKA/autonomous driving mode is released.

In the case of parking assist (PA) mode, an input torque of 6 Nm or higher is deemed to correspond to driver intervention, and the parking assist operation is released.

Meanwhile, as in FIG. 1A to FIG. 1C, there is a difference between the rotation shaft of the steering wheel and the center of gravity. As a result, in the steering wheel hands-off state, a torque offset phenomenon occurs due to the weight of the steering wheel, depending on the angle of the steering wheel.

This poses a problem in that, even without the driver's intervention to apply torque to the steering wheel, input torque is generated by the weight of the steering wheel as in FIG. 1B and FIG. 1C, affecting the control logic of the steering system.

The center of gravity of the airbag mounted on the steering wheel increases the degree of influence of the torque offset.

For example, in the case of MDPS restorative logic, the restorative output is reduced if torque offset generates an input torque of 0.05 Nm or higher. This poses a problem in that the restorative performance is degraded, and the steering wheel becomes heavier.

There is another problem in that, when the restorative output fluctuates due to a change in torque offset resulting from a change in the steering angle, the steering wheel cannot be restored seamlessly.

In an attempt to solve such problems, the intervention determination torque which is used to determine the driver's intervention may be increased, but this poses another problem in that the steering sensitivity is degraded due to decrease in responsiveness to low torque inputs.

In the case of a lane keeping assist (LKA) mode, if the driver's hands are off the steering wheel (hands-off state), and if the torque offset value is above the intervention determination value, no hands-off warning sound is generated, posing a problem of degraded warning delivery function for securing driver safety.

Moreover, even if the driver has no intention to release the LKA mode, the KLA mode may be automatically released if the sum of input torque and torque offset value reaches a predetermined value. This poses a problem in that the vehicle deviates from the path after the LKA mode is released, increasing the risks of accidents.

The parking assist mode has a problem in that, even if the driver has no intention to release the parking assist mode, the parking assist mode is automatically released if the sum of input torque and torque offset value reaches 6 Nm, generating customer inconvenience and complaints regarding corresponding functions.

Furthermore, there may be adverse influences on all logics for autonomous driving control using input toque values in future autonomous driving vehicles, and there is thus a demand for a scheme for minimizing the influence of input torque by torque offset.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for controlling torque offset compensation in a steering system, wherein adverse effects on input torque by torque offset are removed, improving and maintaining steering-related control functions.

In accordance with an aspect of the present disclosure, a method for controlling torque offset compensation in a steering system may include: a torque offset value obtaining operation, by a controller, of obtaining a torque offset value (input torque change value) for each steering angle under a hands-off condition of a steering wheel; a compensation torque determination operation, by the controller, of determining compensation torque configured to counterbalance the torque offset value regarding the steering angle when the steering wheel is steered; and a final torque determination operation, by the controller, of determining a final torque by applying the compensation torque to an input torque detected according to steering of the steering wheel.

The torque offset value may be detected through a lock-to-lock operation of a steering wheel in a hands-off state of the steering wheel.

Compensation torque may be determined by multiplying the torque offset value by a gain value, and the gain value may be different for each steering angular speed.

Compensation torque may be determined by multiplying the torque offset value by a gain value, and the gain value may be different for each vehicle speed.

A torque offset value for each steering angle may be detected a predetermined number of times or more than the predetermined number of times; and an average value of detected torque offset values may be used.

During a lock-to-lock operation, whether input torque exceeds a reference value may be determined.

A torque offset value may be stored in the controller; whether the stored torque offset value is reset may be determined when a vehicle is started; and when the stored torque offset value is to be reset, a torque offset value for each steering angle may be re-obtained to determine compensation torque configured to counterbalance the re-obtained torque offset value.

A torque offset value may be stored in the controller; in a case in which a torque offset value is not stored when a vehicle is started, whether the torque offset value is reset may be determined; and when the torque offset value is to be reset, a torque offset value for each steering angle may be obtained to determine compensation torque configured to counterbalance the obtained torque offset value.

When a torque offset value is not to be reset, a torque offset value of 0 may be applied.

As described above, aspects of the present disclosure are advantageous in that compensation torque is applied to a torque offset value generated by a difference between the center of gravity and the central axis of a steering wheel to counterbalance the torque offset value, removing adverse effects caused by the torque offset on the input torque, and thus safely maintaining a control function related to steering.

Furthermore, compensation of the torque offset value increases accuracy of determination of whether a driver intervenes in steering, improving a steering control function, and ensuring safe control of the vehicle's behavior in cooperative control/ADAS/autonomous driving modes.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
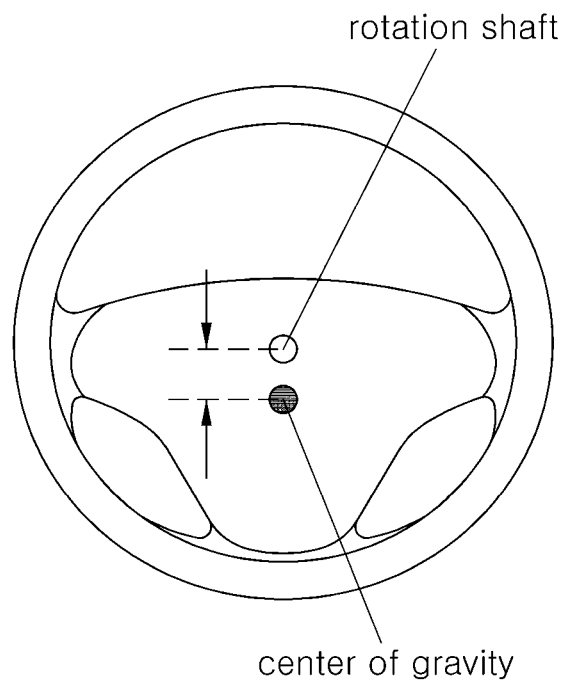
FIG. 1A is a diagram illustrating a torque offset phenomenon which may be caused according to a difference between the center of gravity and a rotation shaft of a steering wheel.
Figure 1B:
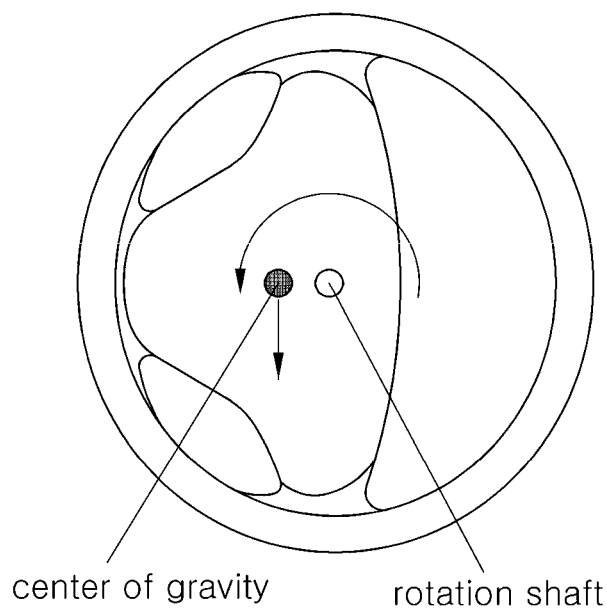
FIG. 1B is a diagram illustrating a torque offset phenomenon which may be caused according to a difference between the center of gravity and a rotation shaft of a steering wheel.
Figure 1C:
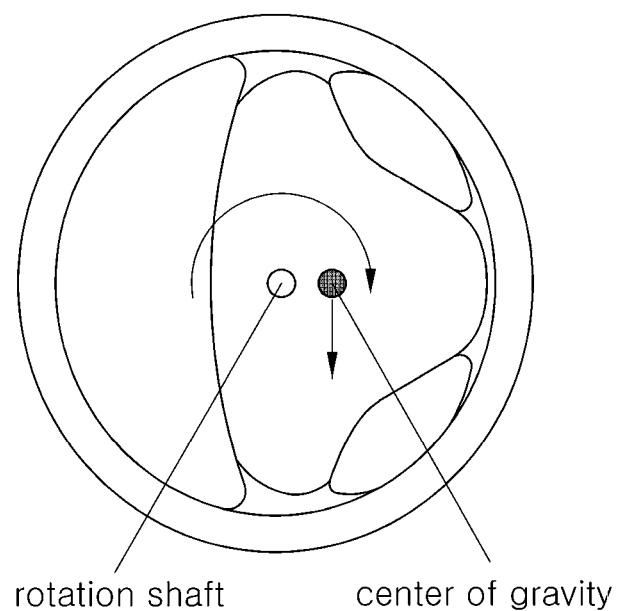
FIG. 1C is a diagram illustrating a torque offset phenomenon which may be caused according to a difference between the center of gravity and a rotation shaft of a steering wheel.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A specific structural or functional description of embodiments of the present disclosure included in the specification or application is provided merely for describing the exemplary embodiment according to an exemplary embodiment of the present disclosure. Therefore, the exemplary embodiments of the present disclosure may be implemented in various forms, and the present disclosure should not be construed as being limited to the embodiments described in the specification or application.

Various changes and modifications may be made to the embodiments according to an exemplary embodiment of the present disclosure, and therefore various exemplary embodiments will be illustrated in the drawings and described in the specification or application. However, it should be understood that embodiments according to the concept of the present disclosure are not limited to the particular disclosed exemplary embodiments of the present disclosure, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, various exemplary embodiments of the present disclosure will be described in detail with reference to the accompanying drawings.

Figure 2:
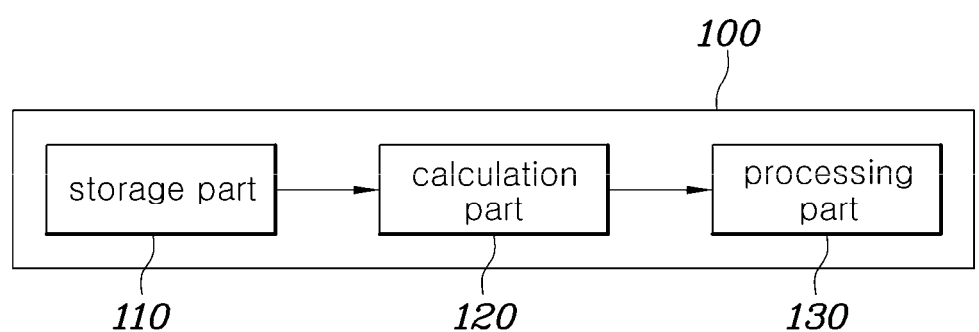
FIG. 2 is a diagram schematically illustrating a system of a torque offset compensation control logic according to the present disclosure.
Figure 3:
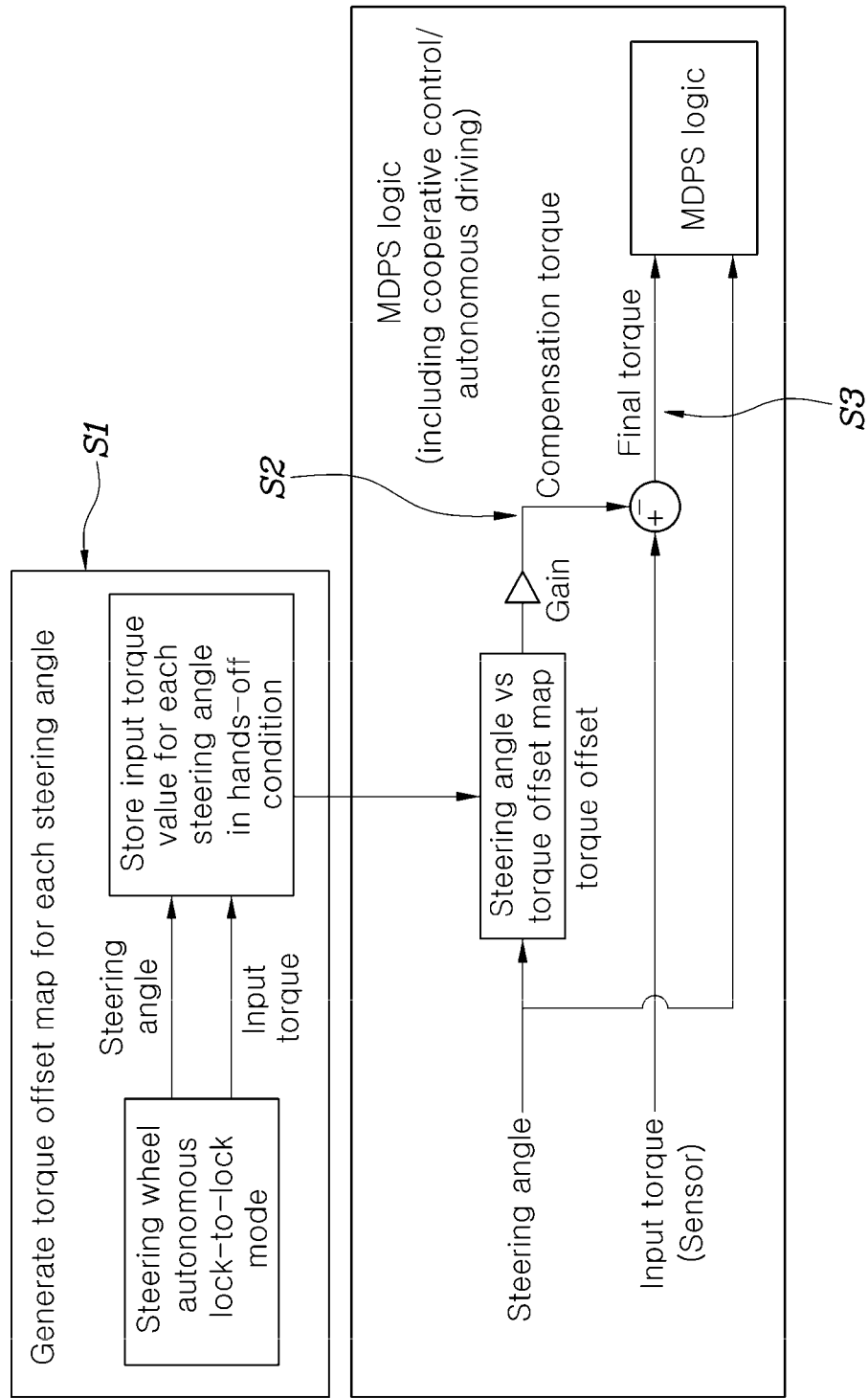
FIG. 3 is a block diagram illustrating a configuration of a system of a torque offset compensation control logic according to the present disclosure.

FIG. 2 is a diagram schematically illustrating a system of a torque offset compensation control logic according to the present disclosure, and FIG. 3 is a block diagram illustrating a configuration of a system of a torque offset compensation control logic according to the present disclosure.

Referring to FIG. 2 and FIG. 3, the present disclosure includes: a torque offset value obtaining operation S1, by a controller 100, of obtaining a torque offset value (input torque change value) for each steering angle under a hands-off condition of a steering wheel: a compensation torque determination operation S2, by the controller 100, of determining compensation torque configured to counterbalance the torque offset value regarding the steering angle when the steering wheel is steered; and a final torque determination operation S3, by the controller 100, of determining a final torque by applying the compensation torque to an input torque detected according to steering of the steering wheel.

For example, the controller 100 includes a storage portion 110, a determination portion 120, and a processing portion 130.

The storage portion 110 may detect a torque offset value generated according to each steering angle in a hands-off condition of a steering wheel and store the torque offset value in a map form when the torque offset value is not stored in advance, and may store a torque offset value generated according to each steering angle in a map form in advance.

When steering of a steering wheel is input in a driving mode such as a MDPS mode, ADAS mode, and an autonomous driving mode, or the like, the determination portion 120 determines compensation torque configured to counterbalance a torque offset value regarding a steering angle according to steering the steering wheel. Furthermore, the determination portion 120 determines final torque by adding the compensation torque to the input torque detected through a torque detector.

Furthermore, the processing portion 130 may operate a steering motor in a driving mode such as a MDPS mode, ADAS mode, and an autonomous driving mode, by receiving the final torque determined by the determination portion 120 to apply an operation command to the steering motor.

That is, the present disclosure may apply the compensation torque to a torque offset value generated due to a difference between the center of gravity and the central axis of a steering wheel to counterbalance the torque offset value to remove adverse effects which may be caused by the torque offset on the input torque, thus safely maintaining a control function related to steering.

Furthermore, the compensation of the torque offset value may increase accuracy of determination of whether a driver intervenes in steering, to improve a steering control function and allow safe control of traveling of a vehicle in cooperative control/ADAS/autonomous driving modes as well.

For reference, the controller 100 according to an exemplary embodiment of the present disclosure may be implemented through a non-volatile memory configured to store an algorithm configured to control operations of various elements of a vehicle or data related to software commands configured to run the algorithm, and a processor configured to perform operations to be described below by use of data stored in the corresponding memory. Here, the memory and the processor may be implemented into separate chips. Alternatively, the memory and the processor may be implemented as an integrated single chip. The processor may have a form of one or more processors.

As shown in FIG. 3, in the torque offset value obtaining operation S1 of the present disclosure, the torque offset value may be detected through a lock-to-lock operation of a steering wheel in a hands-off state of the steering wheel.

That is, by proceeding with the lock-to-lock operation in which the steering wheel is fully steered from one end portion to the other end portion by the steering motor, the torque offset value for each steering angle is detected in the lock-to-lock process.

Figure 4:
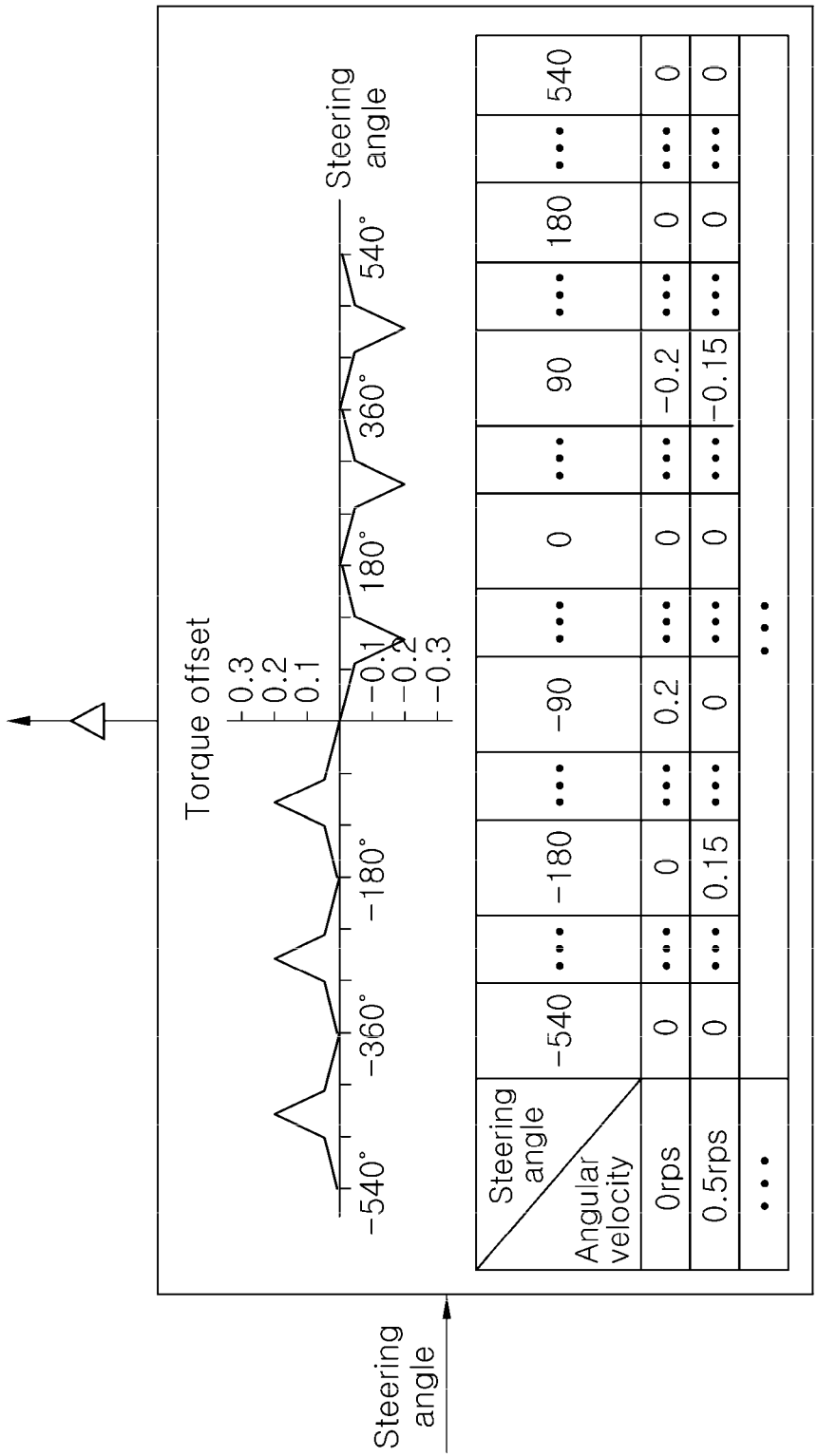
FIG. 4 is a diagram illustrating an operation of determining compensation torque by use of a gain together with a torque offset value of a torque offset map according to the present disclosure.

As shown in FIG. 3 and FIG. 4, in the compensation torque determination operation S2, the compensation torque may be determined by multiplying the torque offset value by a gain value for each steering angle, and the gain value may be changed with a tuning value.

By way of example, the gain value may be differently applied for each steering angular velocity.

The gain value may be differently applied for each vehicle speed.

Figure 5:
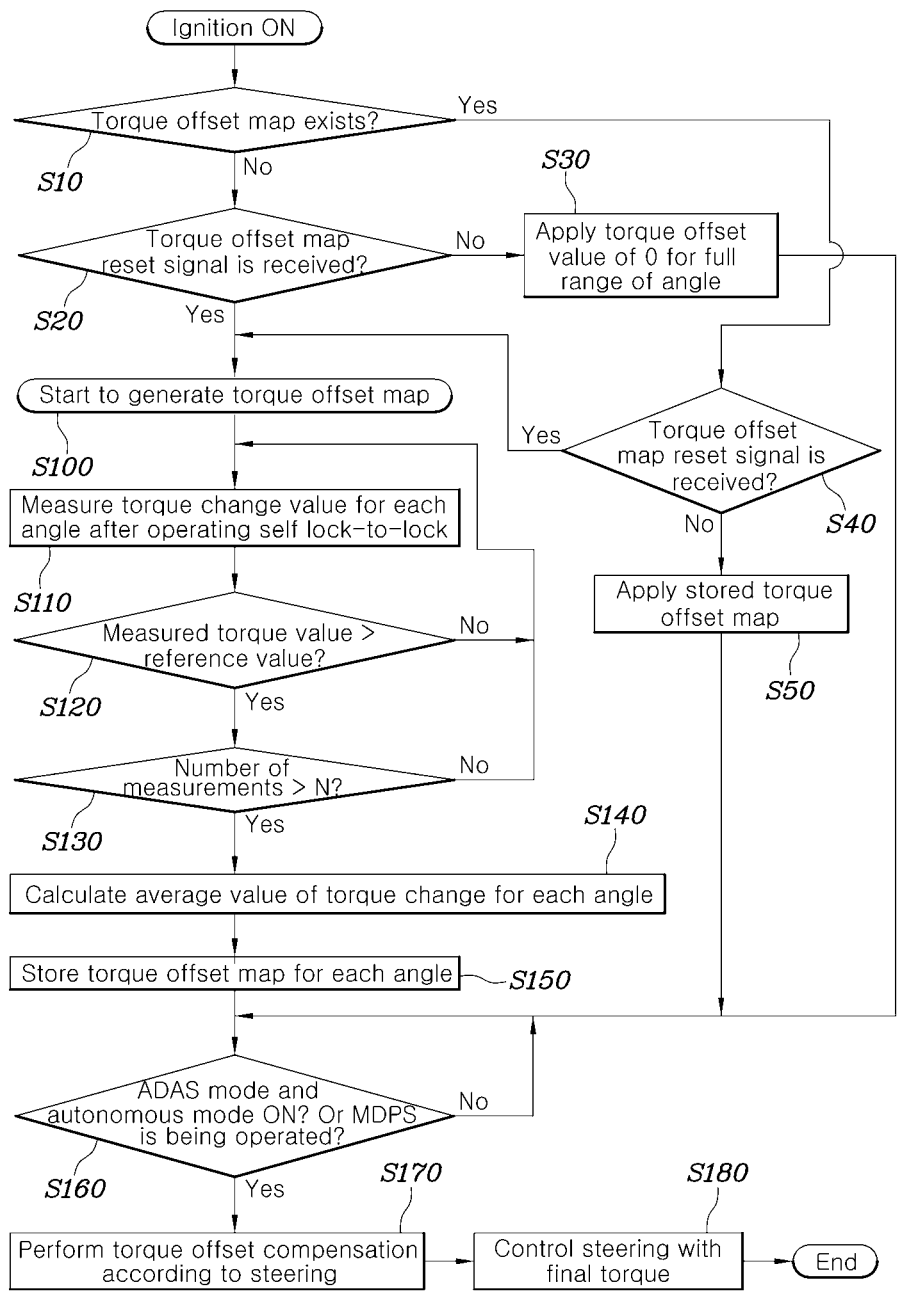
FIG. 5 is a diagram generally illustrating a flow of a torque offset compensation control process according to the present disclosure.

As shown in FIG. 5, in the present disclosure, a torque offset value for each steering angle may be detected a predetermined number of times or more and an average value of detected torque offset values may be used.

In other words, a torque offset value is detected for each steering angle through a lock-to-lock operation of the steering wheel to be stored in a map form, the lock-to-lock operation is performed a predetermined number of times, and a torque offset value is detected for each steering angle at each lock-to-lock operation.

Therefore, reliability of the torque offset value data is secured by storing an average value of the torque offset value for each steering angle as a map form in the storage portion 110 and using the same.

Furthermore, during the lock-to-lock operation, it may be determined whether the input torque exceeds a reference value.

That is, during the lock-to-lock operation, it is examined whether an abnormal situation occurs in which the input torque measured through the torque detector is not detected due to noise or the like.

As shown in FIG. 5, in the present disclosure, a torque offset value is stored in the controller 100; whether the stored torque offset value is reset is determined when a vehicle is started; and when the stored torque offset value is to be reset, the torque offset value for each steering angle is re-obtained to determine the compensation torque configured to counterbalance the re-obtained torque offset value.

That is, even if pre-stored torque offset value map exists in the storage portion 110, when reset of the torque offset value map is required, the compensation torque may be re-determined by re-measuring a torque offset value and the thus final torque having been optimized for a state of the vehicle may be applied.

Furthermore, in the present disclosure, a torque offset value is stored in the controller 100; in a case in which the torque offset value is not stored when a vehicle is started, whether the torque offset value is reset is determined; and when the torque offset value is to be reset, the torque offset value for each steering angle is obtained to determine the compensation torque configured to counterbalance the obtained torque offset value.

That is, when pre-stored torque offset value map does not exist in the storage portion 110, the compensation torque may be determined by measuring a torque offset value and the thus final torque having been optimized for a state of the vehicle may be applied.

However, when the torque offset value is not to be reset, a torque offset value of 0 may be applied.

Hereinafter, a flow of a torque offset compensation control process of a steering system according to the present disclosure will be described by way of example.

When a vehicle is started, it is determined whether a torque offset map exists in the controller 100 (S10).

As a result of the determination of operation S10, when the torque offset map does not exist, it is determined whether a torque offset map reset request by a user exists (S20), and as a result of the determination of operation S20, when the torque offset map reset request exists, generation of a torque offset map is started (S100).

Furthermore, as a result of the determination of operation S10, even when a torque offset map exists, it is determined whether a torque offset map reset request by a user exists (S40).

As a result of the determination of operation S40, when the torque offset reset request exists, generation of a torque offset map is started (S100).

On the other hand, as a result of the determination of operation S40, when the torque offset map reset request does not exist, the torque offset value pre-stored in the controller 100 is applied and the logic proceeds (S50).

Furthermore, as a result of the determination of operation S20, when the torque offset map reset request does not exist, a pre-stored torque offset value map does not exist, and thus "0" is applied for all torque offset values for each steering angle and the logic proceeds.

After operation S100, a torque offset map is generated, for which an input torque change value (torque offset value) is measured for each steering angle through a lock-to-lock operation of the steering wheel under a hands-off condition of the steering wheel (S110).

During the lock-to-lock operation, it is determined whether the input torque measured through the torque detector exceeds a reference value (S120).

As a result of the determination of operation S120, when the input torque exceeds the reference value, it is determined whether the number of measurements of a torque offset value through the lock-to-lock operation exceeds N times (S130) and a torque offset value is measured through the lock-to-lock operation until the number of measurements exceeds N times.

Thereafter, when the number of measurements of a torque offset value through the lock-to-lock operation exceeds N times, an average value of the torque offset values for each steering angle is determined (S140).

The determined average value of the torque offset values for each steering angle is stored in the storage portion 110 of the controller 100 in a map form (S150).

Thereafter, it is determined whether the driving mode of a vehicle is an ADAS mode, an autonomous driving mode is turned on, or a MDPS logic is being operated (S160).

As a result of the determination of operation S160, when the ADAS mode or the autonomous driving mode is turned on, or the MDPS logic is being operated, compensation torque configured to counterbalance the torque offset value according to steering angles is determined, and the compensation torque is applied to input torque detected according to steering to determine final torque to compensate the torque offset value (S170).

Thereafter, the determined final torque is provided to the steering motor based on the steering angles to control a steering operation of the steering system.

As described above, the present disclosure may apply compensation torque to a torque offset value which may be generated by a difference between the center of gravity and the central axis of a steering wheel to counterbalance the torque offset value to remove adverse effects which may be caused by the torque offset on the input torque, thus safely maintaining a control function related to steering.

Furthermore, the compensation of the torque offset value may increase accuracy of determination of whether a driver intervenes in steering, to improve a steering control function and allow safe control of travel of a vehicle in cooperative control/ADAS/autonomous driving modes as well.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling torque offset compensation in a steering system, the method comprising:

obtaining, by a controller, a torque offset value for each steering angle under a hands-off condition of a steering wheel;

determining, by the controller, a compensation torque configured to counterbalance the torque offset value regarding the steering angle when the steering wheel is steered; and determining, by the controller, a final torque by applying the compensation torque to an input torque detected according to steering of the steering wheel, wherein the torque offset value is stored in the controller;

whether the stored torque offset value is reset is determined when a vehicle is started; and when the stored torque offset value is to be reset, the torque offset value for each steering angle is re-obtained to determine the compensation torque configured to counterbalance the re-obtained torque offset value.

2. The method of claim 1, wherein in the obtaining a torque offset value, the torque offset value is detected through a lock-to-lock operation of the steering wheel in a hands-off state of the steering wheel.

3. The method of claim 2, wherein the torque offset value for each steering angle is detected a predetermined number of times or more than the predetermined number of times; and an average value of the detected torque offset values is used.

4. The method of claim 2, wherein during a lock-to-lock operation, whether the input torque exceeds a reference value is determined.

5. The method of claim 1, wherein in the determining a compensation torque, the compensation torque is determined by multiplying the torque offset value by a gain value, and the gain value is different for each steering angular velocity.

6. The method of claim 1, wherein in the determining a compensation torque, the compensation torque is determined by multiplying the torque offset value by a gain value, and the gain value is different for each vehicle speed.

7. The method of claim 1, in a case in which the torque offset value is not stored when the vehicle is started, whether the torque offset value is reset is determined; and when the torque offset value is to be reset, the torque offset value for each steering angle is obtained to determine the compensation torque configured to counterbalance the obtained torque offset value.

8. The method of claim 7, wherein when the torque offset value is not to be reset, the torque offset value of 0 is applied.

9. A non-transitory computer readable storage medium on which a program for performing the method of claim 1 is recorded.

10. A steering system for controlling torque offset compensation, the steering system comprising:

a steering wheel coupled to a steering motor in a vehicle, and a controller configured for:

obtaining a torque offset value for each steering angle under a hands-off condition of the steering wheel;

determining a compensation torque configured to counterbalance the torque offset value regarding the steering angle when the steering wheel is steered; and determining a final torque by applying the compensation torque to an input torque detected according to steering of the steering wheel; and operating the steering motor in a driving mode by receiving the final torque determined to apply an operation command to the steering motor, wherein the torque offset value is stored in the controller;

whether the stored torque offset value is reset is determined when the vehicle is started; and when the stored torque offset value is to be reset, the torque offset value for each steering angle is re-obtained to determine the compensation torque configured to counterbalance the re-obtained torque offset value.

11. The steering system of claim 10, wherein in the obtaining a torque offset value, the torque offset value is detected through a lock-to-lock operation of the steering wheel in a hands-off state of the steering wheel.

12. The steering system of claim 11, wherein the torque offset value for each steering angle is detected a predetermined number of times or more than the predetermined number of times; and wherein an average value of the detected torque offset values is used.

13. The steering system of claim 11, wherein during the lock-to-lock operation, whether the input torque exceeds a reference value is determined by the controller.

14. The steering system of claim 10, wherein in the determining a compensation torque, the compensation torque is determined by multiplying the torque offset value by a gain value, and the gain value is different for each steering angular velocity.

15. The steering system of claim 10, wherein in the determining a compensation torque, the compensation torque is determined by multiplying the torque offset value by a gain value, and the gain value is different for each vehicle speed.

16. The steering system of claim 10, in a case in which the torque offset value is not stored when the vehicle is started, whether the torque offset value is reset is determined; and when the torque offset value is to be reset, the torque offset value for each steering angle is obtained to determine the compensation torque configured to counterbalance the obtained torque offset value.

17. The steering system of claim 16, wherein when the torque offset value is not to be reset, the torque offset value of 0 is applied.

* * * * *